United States Patent
Phelan et al.

(10) Patent No.: US 9,619,248 B2
(45) Date of Patent: Apr. 11, 2017

(54) CONFIGURATION MANAGER AND METHOD FOR CONFIGURING A HOST SYSTEM FOR PROCESSING A PROCESSING JOB IN A VIRTUAL DATA-PROCESSING ENVIRONMENT

(71) Applicant: Bluedata Software, Inc., Mountain View, CA (US)

(72) Inventors: Thomas A. Phelan, San Francisco, CA (US); Joel Baxter, San Carlos, CA (US)

(73) Assignee: Bluedata Software, Inc., Mountain View, CA (US)

( * ) Notice: Subject to any disclaimer, the term of this patent is extended or adjusted under 35 U.S.C. 154(b) by 35 days.

(21) Appl. No.: 14/472,562

(22) Filed: Aug. 29, 2014

(65) Prior Publication Data

US 2015/0067680 A1    Mar. 5, 2015

Related U.S. Application Data

(60) Provisional application No. 61/872,451, filed on Aug. 30, 2013.

(51) Int. Cl.
*G06F 9/455* (2006.01)
*G06F 9/44* (2006.01)
*G06F 9/54* (2006.01)

(52) U.S. Cl.
CPC .............. *G06F 9/443* (2013.01); *G06F 9/541* (2013.01)

(58) Field of Classification Search
CPC ................................. G06F 9/443; G06F 9/465
USPC .................................................................. 718/1
See application file for complete search history.

(56) References Cited

U.S. PATENT DOCUMENTS

| 6,651,140 | B1* | 11/2003 | Kumar | G06F 17/30902 709/213 |
| 6,757,899 | B2* | 6/2004 | Zhdankin | G06F 9/465 719/315 |
| 8,352,941 | B1* | 1/2013 | Protopopov | G06F 9/45558 718/1 |
| 8,468,521 | B2* | 6/2013 | Pawlowski | 718/1 |

(Continued)

OTHER PUBLICATIONS

Czajkowski et al. "SNAP: A Protocol for Negotiating Service Level Agreements and Coordinating Resource Management in Distributed Systems", 2002, Springer-Verlag Berlin Heidelberg, pp. 153-183.*

(Continued)

*Primary Examiner* — Wei Zhen
*Assistant Examiner* — Junchun Wu

(57) ABSTRACT

Described herein are systems, methods, and software for translating data requests in a data processing cluster. In one example, a method of operating a cache service to interface between a virtual machine cluster and job data associated with a job executed by the virtual machine cluster includes identifying a request initiated by the virtual machine cluster to access at least a portion of the job data in accordance with a first distributed object access protocol. The method further includes in response to the request, accessing at least the portion of the job data in accordance with a second distributed object access protocol, and presenting at least the portion of the job data to the virtual machine cluster in accordance with the first distributed object access protocol.

18 Claims, 12 Drawing Sheets

(56) References Cited

U.S. PATENT DOCUMENTS

| | | | | |
|---|---|---|---|---|
| 8,539,484 B1* | 9/2013 | Offer | ................... | G06F 9/45558 |
| | | | | 718/1 |
| 9,043,560 B2* | 5/2015 | Pruthi | ................. | G06F 12/0831 |
| | | | | 718/1 |
| 2008/0163208 A1* | 7/2008 | Burr | ................... | G06F 9/45558 |
| | | | | 718/1 |
| 2009/0094316 A1* | 4/2009 | Chen | ....................... | G06F 9/465 |
| | | | | 718/1 |
| 2010/0199276 A1* | 8/2010 | Umbehocker | ........ | G06F 3/0604 |
| | | | | 718/1 |
| 2011/0119668 A1* | 5/2011 | Calder et al. | ..................... | 718/1 |
| 2012/0272241 A1* | 10/2012 | Nonaka | ................. | G06F 9/5077 |
| | | | | 718/1 |
| 2012/0331461 A1* | 12/2012 | Fries | .................. | H04L 67/2861 |
| | | | | 718/1 |
| 2013/0091230 A1* | 4/2013 | Dentamaro | ............. | H04L 67/06 |
| | | | | 709/206 |
| 2013/0227558 A1* | 8/2013 | Du et al. | ........................... | 718/1 |
| 2014/0123133 A1* | 5/2014 | Luxenberg | ............ | H04L 67/322 |
| | | | | 718/1 |

OTHER PUBLICATIONS

Krsul et al. "VMPlants: Providing and Managing Virtual Machine Execution Environments for Grid Computing", 2004, IEEE.*
Peng et al. "VDN: Virtual Machine Image Distribution Network for Cloud Data Centers", 2012 IEEE.*

* cited by examiner

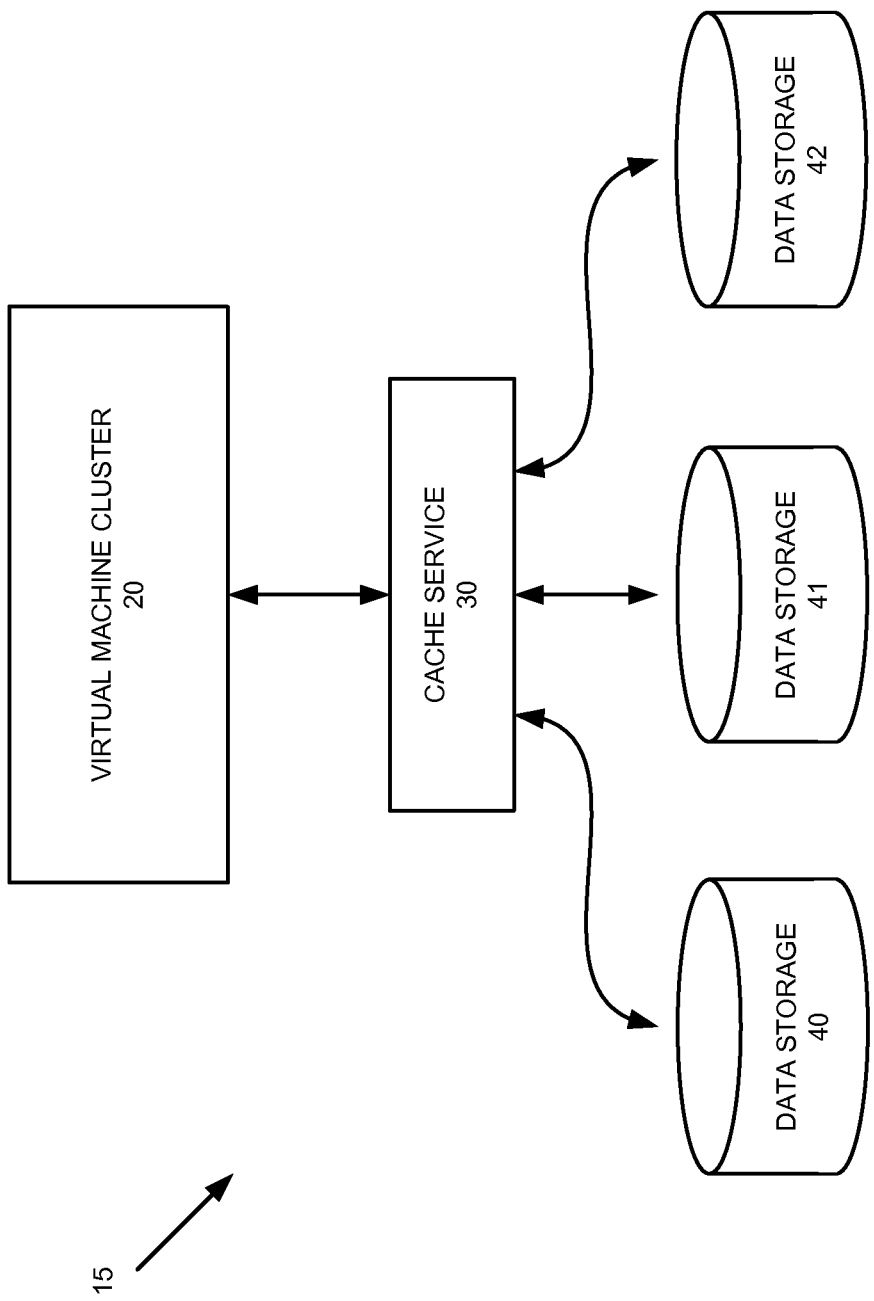

CONFIGURATION MANAGER AND METHOD FOR CONFIGURING A HOST SYSTEM FOR PROCESSING A PROCESSING JOB IN A VIRTUAL DATA-PROCESSING ENVIRONMENT

CROSS-REFERENCE TO RELATED APPLICATION

This patent application refers to, and claims priority to, U.S. provisional patent application No. 61/872,451, entitled "Configuration Manager and Method for Configuring Processing Jobs in Virtual Environments" and filed on Aug. 30, 2013, wherein the prior application is herein incorporated by reference in entirety.

TECHNICAL FIELD

Aspects of the disclosure are related to computing hardware and software technology, and in particular to configuring a host system in a virtual data-processing environment.

TECHNICAL BACKGROUND

An increasing number of data-intensive distributed applications are being developed to serve various needs, such as processing very large data sets that generally cannot be handled by a single computer. Instead, clusters of computers are employed to distribute various tasks, such as organizing and accessing the data and performing related operations with respect to the data. Various applications and frameworks have been developed to interact with such large data sets, including Hive, HBase, Hadoop™, Amazon S3, and CloudStore™, among others.

At the same time, virtualization techniques have gained popularity and are now common place in data centers and other environments in which it is useful to increase the efficiency with which computing resources are used. In a virtualized environment, one or more virtual machines are instantiated on an underlying computer (or another virtual machine) and share the resources of the underlying computer.

However, where a single processing job is running on multiple host systems of a virtual data-processing environment, configuration of the applicable host systems and virtual machines is complex. The configuration will be even more complex when taking into account that the single processing job may be running on multiple virtual machines on multiple host systems. Consequently, small variations or errors in the configuration may result in delayed and/or improper processing of the single processing job. Further, the single processing job may need to obtain data from a plurality of storage systems. The storage systems may have different capacities. The storage systems may use differing object access protocols. The storage systems may differ in the format and/or content of required access credentials.
Overview A method of operating a cache service to interface between a virtual machine cluster and job data associated with a job executed by the virtual machine cluster includes identifying a request initiated by the virtual machine cluster to access at least a portion of the job data in accordance with a first distributed object access protocol. The method further includes in response to the request, accessing at least the portion of the job data in accordance with a second distributed object access protocol, and presenting at least the portion of the job data to the virtual machine cluster in accordance with the first distributed object access protocol.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1A shows a data processing system.

TECHNICAL DISCLOSURE

Figure 1B:
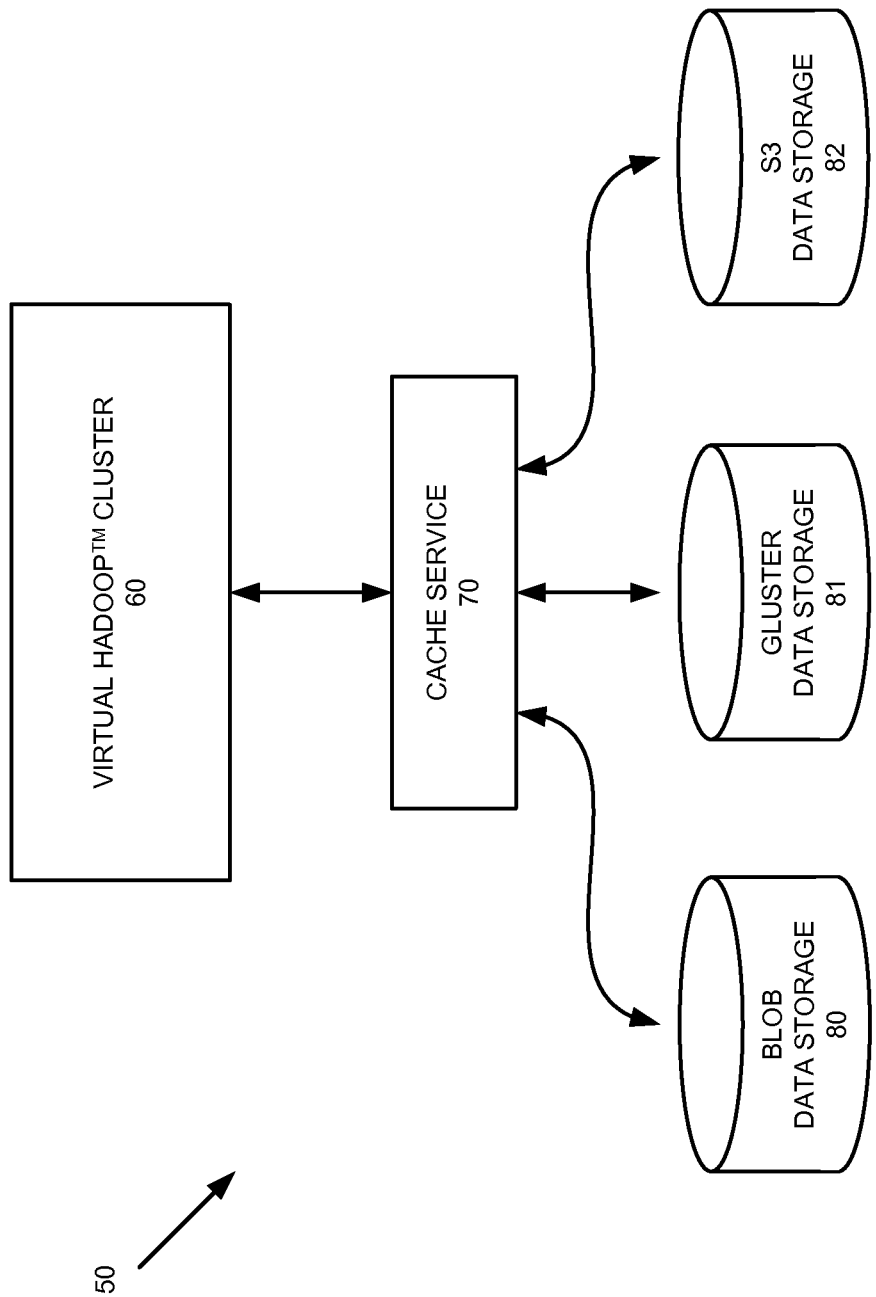
FIG. 1B shows an exemplary data processing system.

FIG. 1A shows a data processing system 15 for distributed data processing using a virtual machine cluster. Data processing system 15 includes virtual machine cluster 20, cache service 30, and data storage systems 40-42. Virtual machine cluster 20 executes on one or more host computing systems that provide a platform for the virtual machines. These host computing systems may include processing systems, storage systems, communication interfaces, user interfaces, and software necessary to execute the virtual machines. The virtual machines may include full operating system virtual instances, but may also include containers, partitions, jails, or other virtual segregation instances.

During the execution of virtual machine cluster 20, cache service 30 may be used to provide data objects from data storage 40-42 to the virtual machines. To accomplish this task, cache service 30 may identify a request by virtual machine cluster 20 to access data in accordance with a first distributed object access protocol, access the data in data storage 40-42 using a second object access protocol, and present the data to virtual machine cluster 20 in accordance with the first distributed object access protocol. For example, virtual machine cluster 20 may be configured to request data using a particular distributed object access protocol. When a data request occurs, cache service 30 identifies the data request, and translates the request to an appropriate access protocol for one of data storage systems 40-42. Accordingly, although virtual machine cluster 20 may use a single protocol, cache service 30 may be used to access data using a plurality of different protocols.

In some instances, to configure cache service 30, a configuration management system may be included. This management system may identify the data storage systems required for a particular job within virtual machine cluster 20. Once identified, the management system determines one or more access protocols necessary to access data within the storage systems, and generates a translation configuration for virtual machine cluster 20 based on the necessary access protocols. This translation configuration allows virtual machine cluster 20 to request data using a first file access format, but access the data in the storage systems using alternative access protocols. Thus, cache service 30 may be configured by the configuration management system to act as a translation intermediary between virtual machine cluster 20 and the data storage systems.

Although illustrated in the present example as using cache service 30 for translating read requests to data storage 40-42, it should be understood that cache service 30 and any translation services described herein might also be used to facilitate writes between the virtual cluster and the data storage. For example, if virtual machine cluster 20 initiated a write to data storage 40 using a first access protocol, cache service 30 may identify the write and translate the write to a second access protocol appropriate for data storage 40. Accordingly, virtual machine cluster 20 may use a single access protocol to initiate the write processes, but cache service 30 may be used to translate the writes to the various access protocols necessary for the storage systems.

As a particular example of the system described in FIG. 1A, FIG. 1B shows an exemplary data processing system 50. The data processing system 50 includes a virtual Hadoop™ cluster 60, a cache service 70 in communication with the virtual Hadoop™ cluster 60, and a plurality of data storages 80, 81, and 82 in communication with the cache service 70. The cache service 70 can be an independent device that is interposed between the virtual Hadoop™ cluster 60 and the plurality of data storages 80-82. Alternatively, the cache service 70 can comprise a component of the virtual Hadoop™ cluster 60 or a component of one or more individual host systems forming the virtual Hadoop™ cluster 60.

The plurality of data storages 80-82 in the example shown store data to be processed by the virtual Hadoop™ cluster 60. The job data may be very large in size. The job data can comprise terabytes (TB) of job data in some examples. The job data in some examples is too large to be stored on a single data storage. Each of the data storages 80, 81, and 82 in the example stores a portion of the data to be processed by the virtual Hadoop™ cluster 60.

A data storage of the plurality of data storages 80-82 can comprise a single storage device, such as a hard disk drive. Alternatively, a data storage can comprise a storage system made up of many storage devices. The plurality of data storages 80-82 can be co-located with the virtual Hadoop™ cluster 60 or can be remote from the virtual Hadoop™ cluster 60.

In operation, virtual Hadoop™ cluster 60 obtains data from the plurality of data storages 80-82 in order to process the data. Each data storage in the example shown uses a different object access protocol. The data storage 80 uses a Blob object access protocol. The data storage 81 uses a Gluster™ object access protocol. The data storage 82 uses a S3 object access protocol. Consequently, the virtual Hadoop™ cluster 60 in the example is not able to obtain data from all of the BLOB, Gluster™, and S3 object access protocols.

The cache service operates to facilitate and anonymize data procurement for the virtual Hadoop™ cluster 60. The cache service 70 streamlines data procurement and reduces complexity of the virtual Hadoop™ cluster 60. The cache service 70 interfaces between the virtual Hadoop™ cluster 60 and the plurality of data storages 80-82. The cache service 70 anonymizes job data, wherein the virtual Hadoop™ cluster 60 does not need to know where the job data is stored and does not need to know what object access protocol is needed for obtaining the job data. The cache service 70 is configured in the example to be able to perform at least Blob, Gluster™, and S3 object access protocol data fetches from the plurality of data storages 80-82. It should be understood that the cache service 70 might be configured to communicate with various data storages and corresponding object access protocols.

In operation, the cache service 70 receives a request initiated by the virtual Hadoop™ cluster 60. The request comprises a request to access at least a portion of the job data in accordance with a distributed object access protocol. In response to the request, the cache service 70 accesses at least the portion of the job data in accordance with a plurality of distributed object access protocols. The cache service 70 then presents at least the portion of the job data to the virtual Hadoop™ cluster 60 in accordance with the distributed object access protocol. It should be understood that the portion of the job data presented to the virtual Hadoop™ cluster 60 by the cache service 70 is presented in accordance with the object access protocol of the virtual Hadoop™ cluster 60.

As a result, the virtual Hadoop™ cluster 60 does not need to be programmed or configured to communication with multiple data storages using multiple different object access protocols. The virtual Hadoop™ cluster 60 does not need to be programmed or configured with all possible object access protocols that the virtual Hadoop™ cluster 60 may need for future data processing operations. The virtual Hadoop™ cluster 60 does not need to be repeatedly re-programmed or re-configured to be able to communicate with data storages being used for each new processing job.

It should be understood that the virtual Hadoop cluster 60 is given merely as an illustration. The virtual Hadoop cluster 60 can comprise any processing system that receives job data from multiple data storages and according to multiple object access protocols. Further, in some examples the virtual Hadoop cluster 60 comprises a virtualized or distributed processing system, wherein multiple instantiated virtual machines process the job data. These virtual machines may include full operating system virtual solutions or, in some examples, may include containerized application containers, such as jails, partitions, containers, or other similar virtualization techniques.

Figure 2:
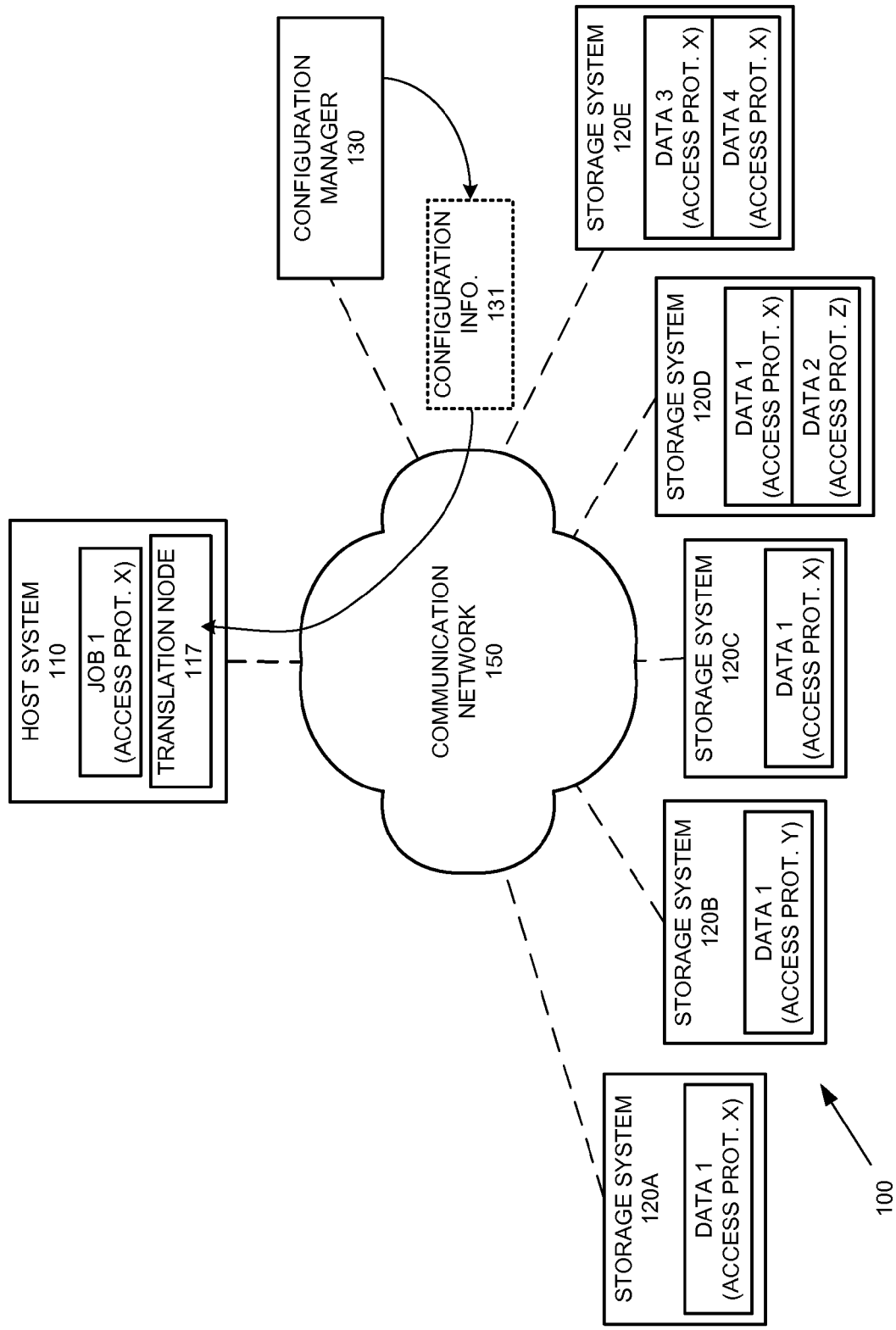
FIG. 2 shows an exemplary configuration manager configured to configure a host system for processing a processing job in a virtual data-processing environment in one example.

FIG. 2 shows an exemplary configuration manager configured to configure a host system for processing a processing job in a virtual data-processing environment 100 in one example. The virtual data-processing environment 100 includes a communication network 150, a host system 110 coupled to the communication network 150, and storage systems 120A-120E coupled to the communication network 150. The host system 110 obtains and processes job data from one or more of the storage systems 120A-120E. The host system 110 accesses the storage systems 120A-120E via the communication network 150. The host system 110 in the example includes a translation node 117. The translation node 117 can be temporarily or permanently installed in the host system 110. A configuration manager 130 is coupled to the communication network 150 and transfers configuration information 131 to the translation node 117 of the host system 110. In some examples, the translation node 117 comprises or includes at least a portion of the cache service 70 of FIG. 1B.

The virtual data-processing environment 100 may be employed in, for example, server computers, cloud computing platforms, data centers, any physical or virtual computing machine, and any variation or combination thereof. The virtual data-processing environment 100 may optionally include additional devices, features, or functionality not discussed here for purposes of brevity.

The host system 110 in the example includes a processing job 1. The processing job in some examples comprises a big data processing job, wherein data files on the order of gigabytes (GB), terabytes (TB), or more of data are to be processed. In some examples, the host system 110 can host multiple virtual machines 103 (see FIG. 8 and the accompanying discussion). When the host system 110 is processing the processing job 1, in this example the host system 110 obtains job data for the processing job 1 from the storage systems 120A-120D. However, it should be understood that job data can be stored in any number of storage systems 120, including storage systems 120 of different locations, different sizes, and different object access protocols.

The job data may be stored in a common and expected data format that does not necessarily need any translation. For example, the job data stored in the storage systems 120A-120D can comprise call records. However, the object access protocols used to request and receive job data may require translation so that the host system 110 can properly request and receive job data from a particular host system 110. The individual storage systems 120 can store the data using different object access protocols, including different file access formats and different file access credentials.

In the example shown, the host system 110 uses an object access protocol X. The storage systems 120A and 120C already employ the object access protocol X in the example. However, storage system 120B uses a object access protocol Y, while the storage system 120D uses object access protocols X and Z. File access transactions with the storage system 120B and the storage system 120D will require object access protocol translations.

For example, the host system 110 may expect and only operate on job data stored according to a Hadoop™ Distributed File System (HDFS) object access protocol (i.e., the object access protocol X), while the storage system 120B could employ a Gluster™ file system and object access protocol and the storage system 120D could employ a Cloudstore™ file system and object access protocol. However, other object access protocols are contemplated and are within the scope of the description and claims. Consequently, without the translation node 117, the host system 110 would have to issue different file access transactions to the storage systems 120B and 120D than the file access transactions used for the storage systems 120A and 120C.

The translation node 117 is interposed between the host system 110 and the one or more storage systems 120A-120D and translates file access transactions. The translation node 117 translates object access protocols to facilitate file access transactions, such as reads and writes, between the host system 110 and the one or more storage systems 120A-120D. As a result, the host system 110 does not need to know what object access protocols are used by the storage systems 120. The host system 110 does not need to be programmed to perform proper file access transactions with multiple different object access protocols that may be used by the various storage systems 120. Consequently, the host system 110 does not need to be programmed with a set of all possible different object access protocols in order to obtain job data from multiple storage systems for job processing. The host system 110 can operate as if using only one object access protocol. Further, the host system 110 does not need to be re-programmed for successive job processing operations.

The translation node 117 anonymizes the data from the host system 110. As a result, the host system 110 issues data read requests that do not take into account the actual storage systems and actual object access protocols. The translation node 117 therefore simplifies and enhances the operation of the host system 110. The host system 110 does not need to be programmed or modified according to the storage system or systems to be accessed during the processing of each successive processing job.

The configuration manager 130 communicates with the host system 110 via the communication network 150 and provides the configuration information 131 to the translation node 117 of the host system 110. The configuration information 131 includes one or more file access translation modules in some examples. The one or more file access translation modules are selected according to one or more predetermined storage systems to be accessed by the host system 110 when processing the processing job 1.

In operation, as part of configuring the host system 110 for processing the processing job 1, the configuration manager 130 receives a job designation of the processing job 1. The configuration manager 130 uses the job designation to determine one or more predetermined storage systems to be used (i.e., determines the storage systems that hold job data for the processing job 1). The configuration manager 130 further determines the object access protocols used by each storage system of the one or more predetermined storage systems. The configuration manager 130 obtains one or more file access translation modules according to the determined object access protocols. The configuration manager 130 provides the determined one or more file access translation modules to the translation node 117 of the host system 110.

In some examples, the configuration manager 130 is configured to configure a host system 110 for processing a processing job in a virtual data-processing environment 100, comprising obtaining a job designation of the processing job, determining one or more predetermined storage systems 120 to be accessed by a host system 110 when processing the processing job, determining one or more corresponding object access protocols used by the one or more predetermined storage systems 120, determining one or more file access translation modules 131 corresponding to the one or more object access protocols, and providing the one or more file access translation modules 131 to the host system 110. The one or more file access translation modules 131 are configured to translate file access transactions for each storage system of the one or more predetermined storage systems 120.

The configuration manager 130 supplies the translation modules per-job to each host system, as needed. The translation modules are independent of the host systems and the programming of the host systems. The translation modules are independent of the allocated virtual machines of the host systems and are independent of the programming of the virtual machines of the host systems.

A data-processing customer does not need to specify anything other than a processing speed and/or job duration in some examples. The customer does not need to worry about the number of host systems needed, the number of virtual machines needed, the memory needed, etc. The customer need only specify where the job data is stored and the data size. In some examples, the customer may optionally designate the object access protocols needed for the specified storage systems. Alternatively, the configuration manager can determine the object access protocols needed for the specified storage systems, without the customer needing to provide the object access protocol information.

The job processing speed or job duration can be specified by a Quality of Service (QoS) value in some examples. The QoS value can be used to set (and achieve) a desired data consumption rate and/or a desired job completion time. The QoS value can be used to determine a minimum and/or maximum resource usage in virtual machine hosting. Further, the QoS value can be used to determine relative job priorities when host system resources are over-committed.

Figure 3:
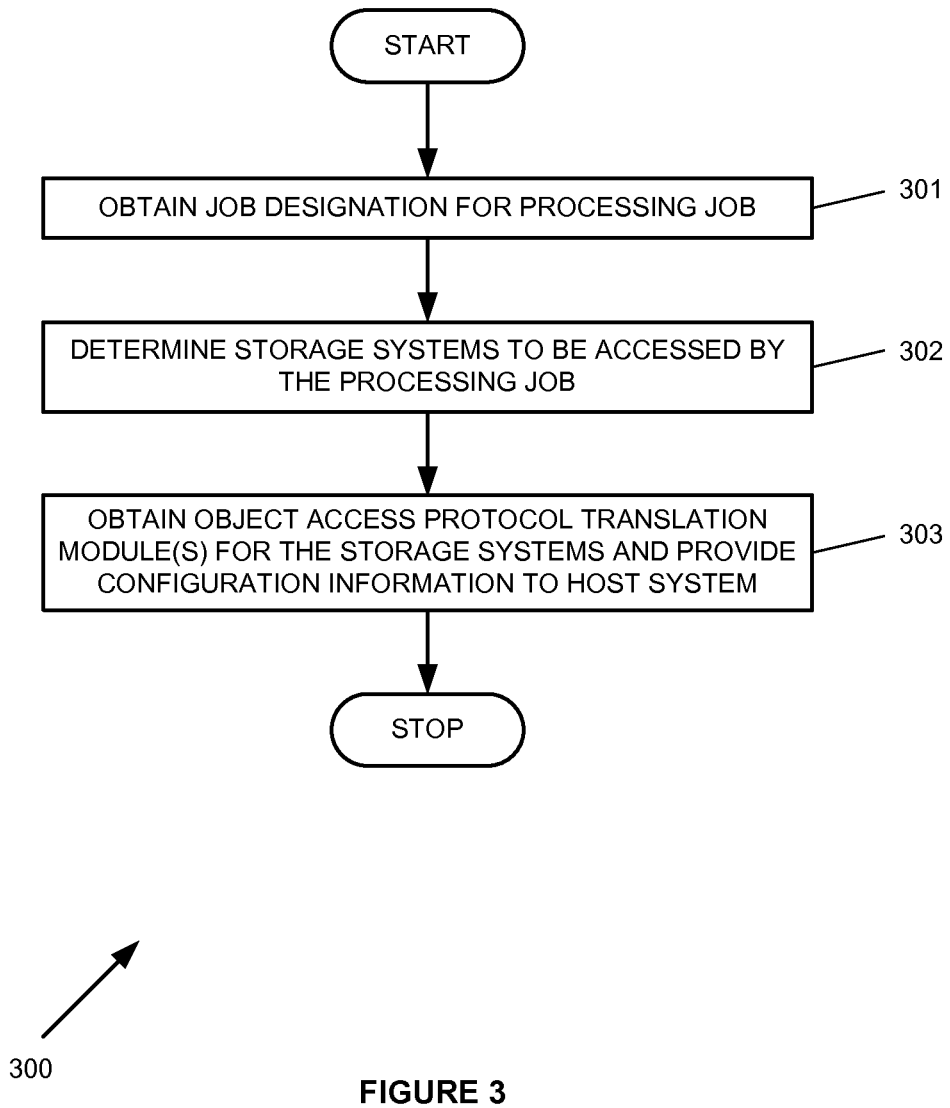
FIG. 3 shows a flowchart of a method for configuring a host system for processing a processing job in a virtual data-processing environment in one example.

FIG. 3 shows a flowchart 300 of a method for configuring a host system for processing a processing job in a virtual data-processing environment in one example. In step 301, the configuration manager obtains a job designation for the processing job. The job designation includes storage system information that identifies one or more predetermined storage systems to be accessed when processing the processing job. The job designation includes storage system information that identifies object access protocols that are used by the one or more predetermined storage systems.

In step 302, the configuration manager processes the job designation and determines the one or more predetermined storage systems to be accessed by a host system when processing the processing job. The determining can include determining the storage system addresses (or other information needed for obtaining job data from the one or more predetermined storage systems). The determining includes determining the object access protocols of the one or more predetermined storage systems to be accessed or written to.

In step 303, the configuration manager obtains one or more file access translation modules corresponding to the one or more object access protocols and provides the one or more file access translation modules to the host system. The configuration manager provides the one or more file access translation modules to a translation node of the host system in some examples. The one or more file access translation modules include a object access protocol translation module for each applicable object access protocol. The translation node receives the one or more file access translation modules and translates the file access transactions that are directed to each storage system. As a result, the host system can perform file access procedures in a single object access protocol. The host system will not need to have its programming changed in order to accommodate new and different storage systems of new and different object access protocols.

Figure 4:
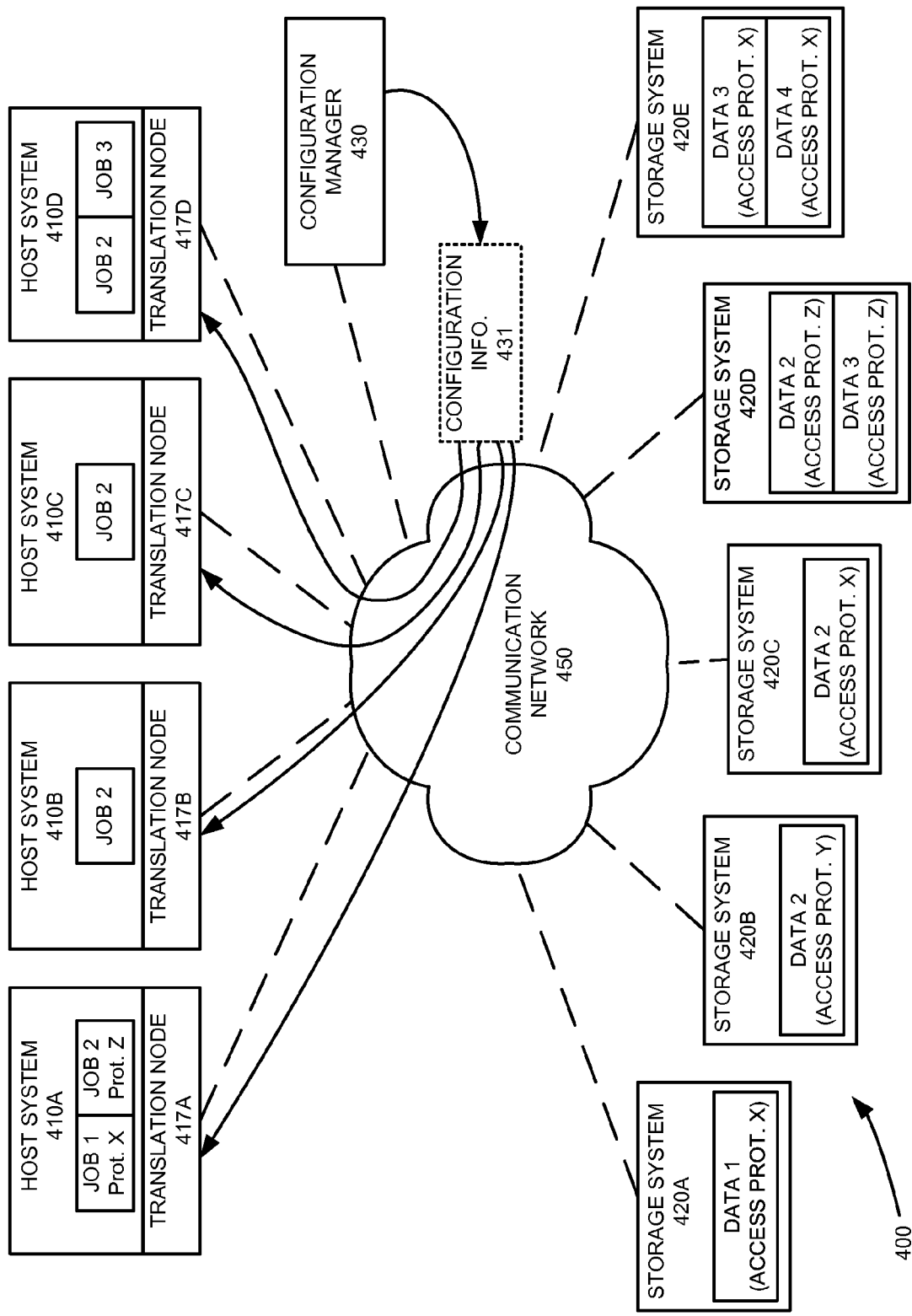
FIG. 4 shows an exemplary configuration manager configured to configure a host system for processing a processing job in a virtual data-processing environment in another example.

FIG. 4 shows an exemplary configuration manager 430 configured to configure a host system or systems 410 for processing a processing job in a virtual data-processing environment 400 in another example. In the virtual data-processing environment 400, a configuration manager 430 interacts with and configures a plurality of host systems 410. The virtual data-processing environment 400 includes a communication network 450, the plurality of host systems 410A-410D coupled to the communication network 450, and storage systems 420A-420E coupled to the communication network 450. Each host system 410 obtains and processes job data from one or more of the storage systems 420A-420E. The plurality of host systems 410A-410D access the storage systems 420A-420E via the communication network 450. Each host system 410 includes a translation node 417 that participates in and facilitates read operations between the host system 410 and an appropriate storage system or systems 420. The translation nodes 417 can be temporarily or permanently installed in the host systems 410. A configuration manager 430 is coupled to the communication network 450 and transfers configuration information 431 to the translation nodes 417 of the plurality of host systems 410.

Big-data processing jobs that are being processed in the virtual data-processing environment 400 can be distributed across the plurality of host systems 410, wherein the processing rate of a big-data processing job is accelerated by the plurality of host systems 410 working in parallel. In addition, each host system 410 can host multiple virtual machines 103 (see FIG. 8 and the accompanying discussion). As a result, a portion of a big-data processing job given to a particular host system 410 can be distributed across multiple virtual machines instantiated in the host system 410.

Job setup is difficult in such a distributed virtual data-processing environment. Where a processing job is to be distributed across the plurality of host systems 410, and is further to be distributed across multiple virtual machines within each host system 410, configuring the appropriate host systems 410 (and virtual machines 103) is a large and complicated task.

In the example shown, the host system 410A is processing a processing job 1 and a processing job 2. The host systems 410B and 410C are both processing the processing job 2. The host system 410D is processing the processing job 2 and a processing job 3. In the figure, the processing job 2 is being processed (at least in part) by the four host systems 410A-410D. Therefore, in order to prepare the virtual data-processing environment 400 for the processing job 2, for example, the configuration manager 430 must provide configuration information 431 for the processing job 2 to the host systems 410A, 410B, 410C, and 410D.

Where the host system 410A is processing at least a portion of processing job 1, the host system 410A can obtain job data from the storage system 420A. In addition, the host system 410A may also need to obtain job data for processing job 2. Consequently, the host system 410A may need to obtain at least a portion of the job data 2 from the storage systems 420B, 420C, and 420D. In the example given, the host system 410B, the host system 410C, and the host system 410D also need to obtain at least a portion of the job data 2, while the host system 410D further must obtain at least some of the job data 3 for use in the processing job 3.

The configuration manager 430 communicates with the plurality of host systems 410 via the communication network 450 and provides the configuration information 431 to the translation nodes 417 of the plurality of host systems 410. The configuration information 431 comprises one or more file access translation modules. The one or more file access translation modules are selected according to one or more predetermined storage systems to be accessed by the plurality of host systems 410 when processing a particular processing job.

In operation, as part of configuring the host system 410A for processing the processing job 1, the configuration manager 430 receives a job designation of the processing job 1. The configuration manager 430 uses the job designation to determine one or more predetermined storage systems to be used (i.e., determines the storage systems that hold job data for the processing job 1), which is the storage system 420A in this example. The configuration manager 430 determines the object access protocol used by the storage system 420A. The configuration manager 430 obtains a file access translation module according to the determined object access protocol of the storage system 420A. The configuration manager 430 provides the determined file access translation module to the translation node 417A of the host system 410A, as only the host system 410A will access the storage system 420A for processing job 1.

If the configuration manager 430 is configuring the virtual data-processing environment 400 for processing job 2, then the host systems 410A-410D will need to perform file access transactions with the storage systems 420B, 420C, and 420D. The configuration manager 430 will send appropriate configuration information 431 to the translation nodes 417A, 417B, 417C, and 417D of the host systems 410A, 410B, 410C, and 410D.

If the configuration manager 430 is configuring the virtual data-processing environment 400 for processing job 3, then the host system 410D will need to perform file access transactions with the storage systems 420D and 420E. The configuration manager 430 will send appropriate configuration information 431 to the translation node 417D of the host system 410D.

In some examples, the configuration manager 430 is configured to configure a plurality of host systems 410 for processing a processing job in a virtual data-processing environment 400, comprising obtaining a job designation of the processing job, determining the plurality of host systems 410 to be allocated to the processing job, determining one or more predetermined storage systems 420 to be accessed by the plurality of host systems 410 when processing the processing job and determining one or more corresponding object access protocols used by the one or more predetermined storage systems 420, and determining one or more file access translation modules 431 corresponding to the one or more object access protocols and providing a file access translation module of the one or more file access translation modules to each applicable host system of the plurality of host systems, with the one or more file access translation modules 431 configured to be used by the plurality of host systems to translate file access transactions for each storage system of the one or more predetermined storage systems 420.

Figure 5:
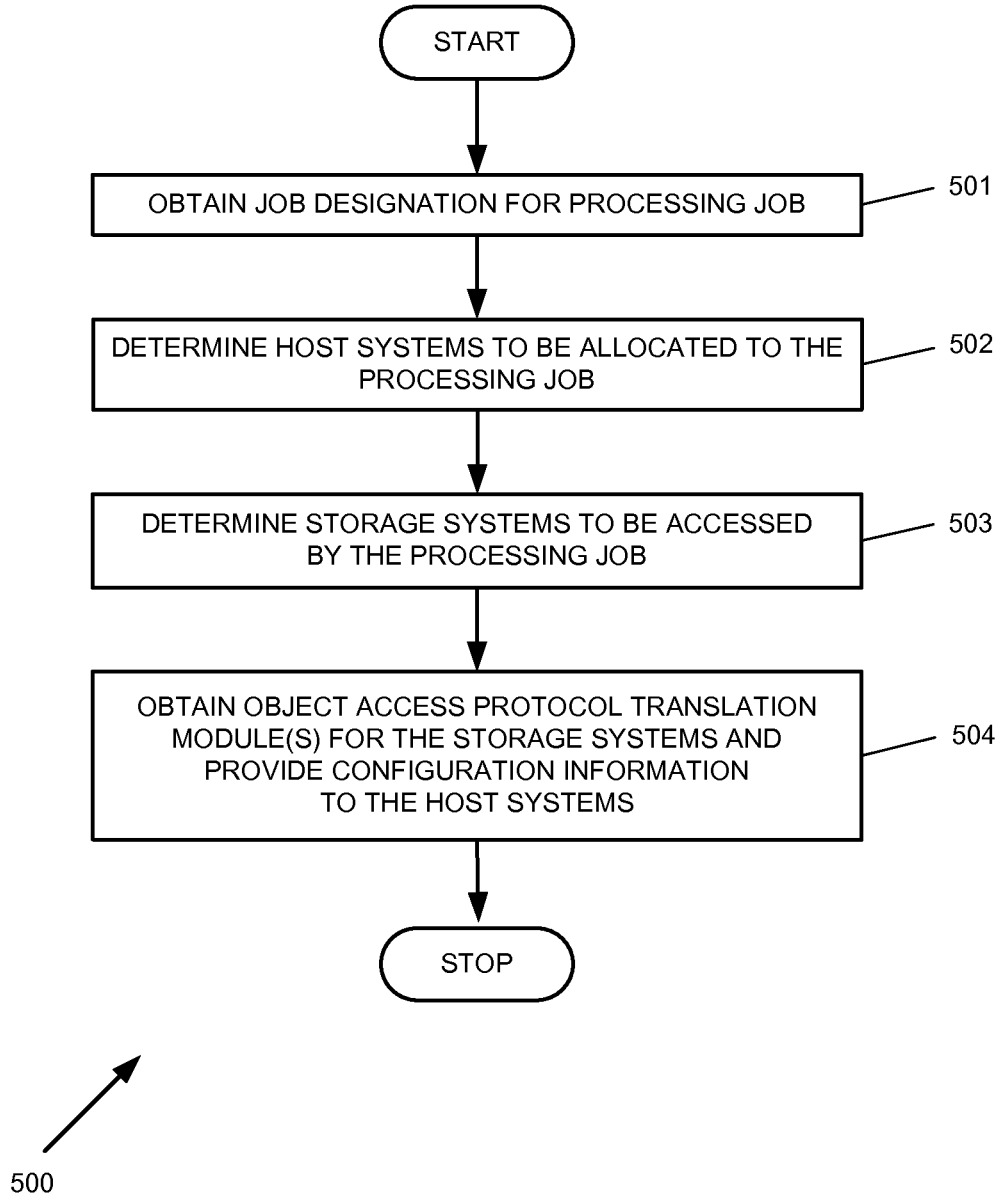
FIG. 5 shows a flowchart of a method for configuring a plurality of host systems for a processing job in a virtual data-processing environment in another example.

FIG. 5 shows a flowchart 500 of a method for configuring a plurality of host systems for a processing job in a virtual data-processing environment in another example. In step 501, the configuration manager obtains a job designation for the processing job. The job designation includes storage system information that identifies one or more predetermined storage systems to be accessed when processing the processing job. The job designation includes storage system information that identifies object access protocols that are used by the one or more predetermined storage systems.

In step 502, the configuration manager determines a plurality of host systems to be allocated to the processing job. The configuration manager may need to provide configuration information to more than one host system in some cases. The number of host systems employed in processing a processing job will typically not affect the number of storage systems involved. However, the number of host systems will affect the duration of the processing job.

The determining in some examples comprises the configuration manager receiving a designation of the plurality of host systems to be used in processing the processing job. The designation of the plurality of host systems can comprise a customer specification or can be received from a technician operating the virtual data-processing environment. The number of host systems (and the resources to be allocated within the host systems) can be determined according to various factors, including job size, job data consumption rate, and a job processing rate or job completion time as specified by a customer.

In step 503, the configuration manager processes the job designation and determines the one or more predetermined storage systems to be accessed by a host system when processing the processing job. The determining can include determining the storage system addresses (or other information needed for obtaining job data from the one or more predetermined storage systems). The determining can include determining the number of storage systems to be accessed. The determining includes determining the object access protocols of the one or more predetermined storage systems to be accessed.

In step 504, the configuration manager determines one or more file access translation modules corresponding to the one or more object access protocols and provides the one or more file access translation modules to each applicable host system of the plurality of host systems. The configuration manager provides the one or more file access translation modules to the plurality of translation nodes of the plurality of host systems in some examples. The one or more file access translation modules are configured to be used by each host system of the plurality of host systems to translate file access transactions for each storage system of the one or more predetermined storage systems. The one or more file access translation modules comprise object access protocol translation modules for each applicable object access protocol. The plurality of translation nodes receive the one or more file access translation modules and translate the file access transactions directed to each storage system of the one or more predetermined storage systems. As a result, each host system of the plurality of host systems can perform file access procedures in a single object access protocol. The plurality of host systems will not need to have their programming changed in order to accommodate new and different storage systems of new and different object access protocols.

Figure 6:
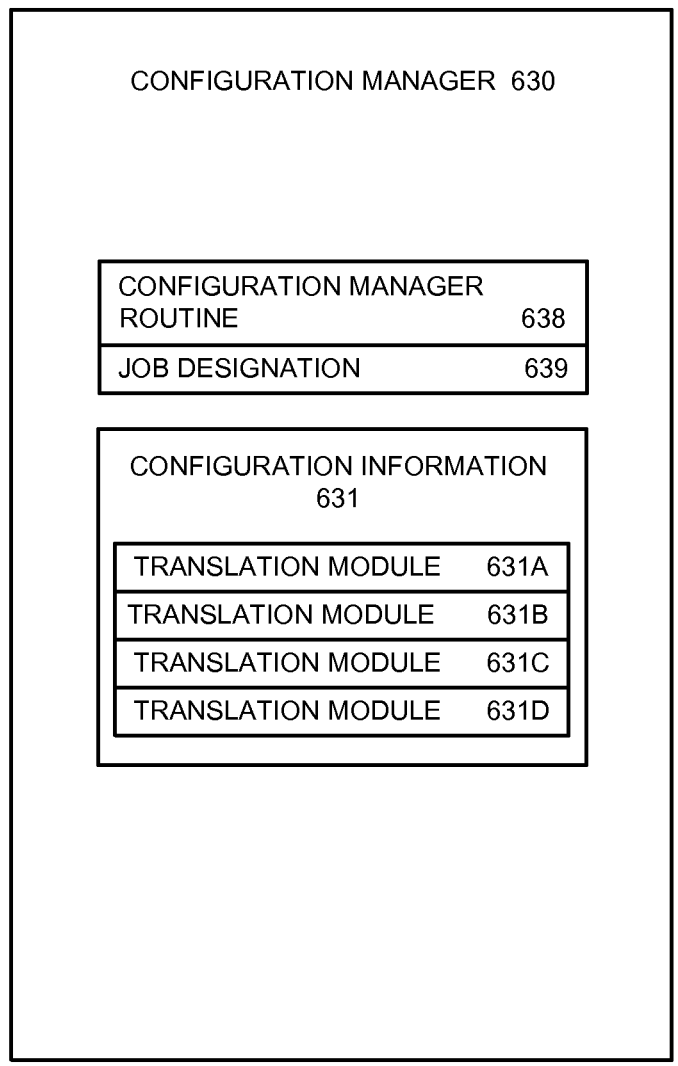
FIG. 6 shows detail of an exemplary configuration manager in one example.

FIG. 6 shows detail of an exemplary configuration manager 630 in one example. The configuration manager 630 maybe the same as or different from the configuration manager 130 of FIG. 2 or the configuration manager 430 of FIG. 4. The configuration manager 630 in the example shown includes a configuration manager routine 638, a job designation 639, and configuration information 631.

The configuration manager 630 receives operator inputs for generating a processing job. The configuration manager 630 uses the operator inputs to generate configuration information 631 for the processing job. The configuration manager 630 sends the configuration information 631 to an appropriate host system or systems 110, wherein the host system or systems 110 are consequently configured for operation in processing the processing job. The host system or systems 110 are properly and fully configured by the configuration information 631 and are ready to commence the processing job.

The configuration manager routine 638 comprises a processing routine configured to perform configuration operations. More specifically, the configuration manager routine 638 is configured to perform configuration operations on translation nodes 117 of the host system or systems 110. The configuration manager routine 638 gathers information and generates configuration information 631 for each processing job to be performed. The configuration manager routine 638 then transfers the configuration information 631 to all appropriate host systems 110 and/or to all appropriate corresponding translation nodes 117.

The job designation 639 comprises processing job information concerning a processing job to be performed by the host system or systems 110. The job designation 639 is processed by the configuration manager routine 638 to determine storage system information for the processing job. The job designation 639 can be processed by the configuration manager routine 638 to determine locations and numbers of the storage systems to be accessed by the processing job. The job designation 639 can be processed by the configuration manager routine 638 to determine object access protocols of the storage systems to be accessed by the processing job.

The configuration information 631 in the example shown comprises one or more file access translation modules. The number of file access translation modules can match the number of storage systems accessed in the processing job in some examples. However, where one or more storage systems employ a object access protocol matching the object access protocol of a host system, then fewer file access translation modules may be needed than the number of storage systems.

Where four storage systems 120A-120D are to be accessed during a processing job, then the configuration information 631 comprises up to four file access translation modules 631A-631D, for example. Fewer than four may be needed, such as where two or more storage systems use the same object access protocol. In addition, where one or more storage systems employ a object access protocol matching the object access protocol of a host system or systems, then fewer file access translation modules may be needed than the number of storage systems.

The configuration information 631 can be retained in the configuration manager 630 even after the processing job has been completed. The configuration information 631 can be stored as a data services container, in one example. The configuration information 631 can be later re-used. The configuration information 631 can be re-used to conduct similar processing jobs. The configuration information 631 can be re-used for other processing jobs of the client.

The configuration information 631 can include additional information. The additional information can include a desired QoS. The additional information can include a processing application and/or a guest application to be used for the new processing job. The additional information can include processing application options. The additional information can include one or more data inputs. The one or more data inputs can be identified using data connectors, such as is common in specifying an Application Programming Interface (API). The additional information can include an output location, such as a data group and a path to a folder within that data group, for example.

Figure 7:
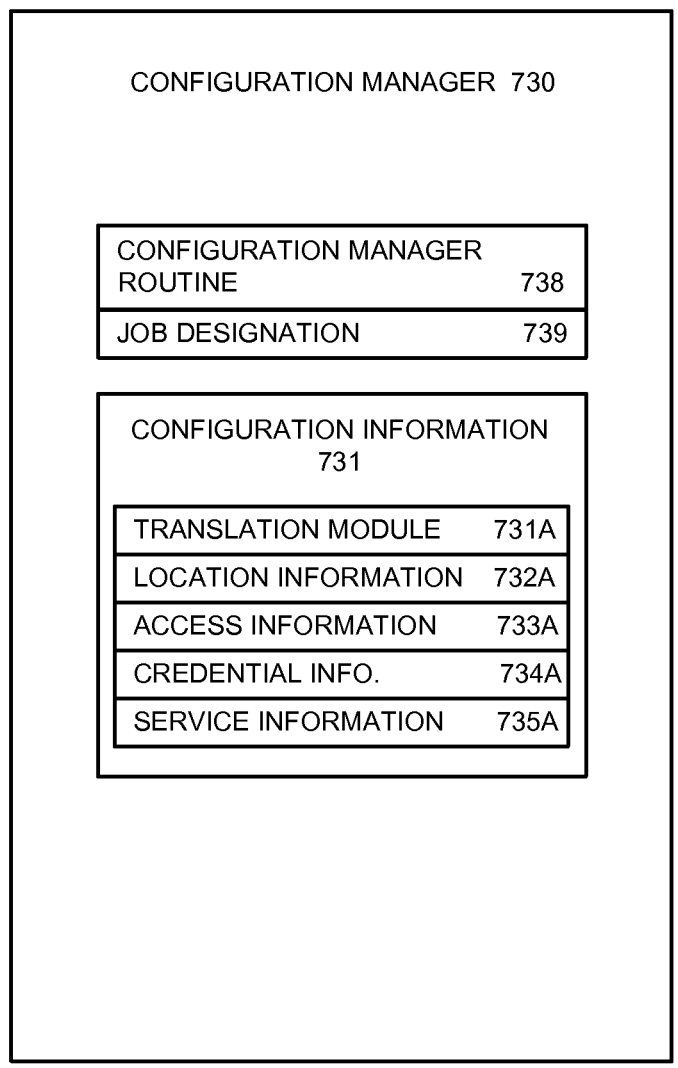
FIG. 7 shows detail of an exemplary configuration manager in another example.

FIG. 7 shows detail of an exemplary configuration manager 730 in another example. The configuration manager 730 maybe the same as or different from the configuration manager 130 of FIG. 2, the configuration manager 430 of FIG. 4, or the configuration manager 630 of FIG. 6. The configuration manager 730 in the example shown includes a configuration manager routine 738, a job designation 739, and configuration information 731.

The configuration information 731 in the example shown comprises one or more file access translation modules 731A, as previously discussed. Each object access protocol translation module can include information including location information 732A, access information 733A, credential information 734A, and service information 735A.

The configuration manager 730 generates location information 732A to be used in a processing job. The location information 732A enables a host system or systems 110 to access the one or more predetermined storage systems 120. The location information 732A therefore includes information that enables the host system or systems 110 to communicate with the appropriate storage systems 120. The location information 732A can comprise any manner of storage system address or identifier. For example, in the figure the location information 732A will direct the host system or systems 110 to access the storage system 120A and obtain the job data. It should be understood that the location information 732A may be different when loaded into each selected host system 110 of the new processing job. In addition, the location information 732A may be different when loaded into each selected virtual machine 103 of the new processing job.

The configuration manager 730 generates access information 733A to be used in a processing job. The access information 733A comprises information that enables the host system or systems 110 to obtain predetermined job data portions from the storage systems 120. The access information 733A can specify an entire job data portion stored within a storage system 120 or can specify specific portions of the job data. The access information 733A may be different for each host system 110. In addition, the access information 733A may be different when loaded into each selected virtual machine 103 of the new processing job.

The configuration manager 730 generates credential information 734A to be used in a processing job. The credential information 734A comprises predetermined access information that enables one or more predetermined persons to access to the one or more predetermined storage systems 120. Alternatively, or in addition, the credential information 734A gives a predetermined person or persons access to a processing job and/or to the configuration manager 730. The credential information 734A can comprise any manner of suitable identifier(s), password(s), or other information suitable of secure and controlled access. In addition, the credential information 734A can include or specify predetermined security measures, including encryption and/or other security measures. The one or more predetermined persons can use the credential information 734A to access the one or more predetermined storage systems 120. The one or more predetermined persons can review the one or more predetermined storage systems 120 and can access predetermined data unit portions in the one or more predetermined storage systems 120. The one or more predetermined persons can review the location information 732A, review the access information 733A, and/or review the service information 735A, wherein the one or more predetermined persons can compare the selected storage systems to the location information 732A, the access information 733A, and/or the service information 735A. Alternatively, or in addition, the one or more predetermined persons can use the credential information 734A to access a processing job, review operational aspects of the processing job, modify the processing job, or receive results from the processing job.

The configuration manager 730 generates service information 735A to be used in a processing job. The service information 735A comprises service type information for each storage system 120 of the one or more predetermined storage systems 120. The service information 735A includes a data access protocol type for each storage system 120 (such as object access protocols X, Y, and Z in the figure), wherein the data access protocol type may vary from a data access protocol used and expected by a particular processing application.

The service information 735A may include an optimal size of job data portions that can be transferred from the storage system 120. For example, a storage system 120 may have a data transfer limit, wherein a larger data request will not result in faster data procurement or may even result in slower data procurement.

The service information 735A may include conversion information for converting the data access protocol needed for obtaining data unit portions from individual storage systems 120 of the one or more predetermined storage systems 120. The configuration manager 730 therefore further virtualizes the new processing job by enabling data access protocol conversion before the receiving host system operates on the received job data or job data portions. The configuration manager 730 transfers conversion information to a translation node in the host system. As a result, each translation node can perform data access protocol conversion for interactions with the one or more storage systems 120.

Figure 8:
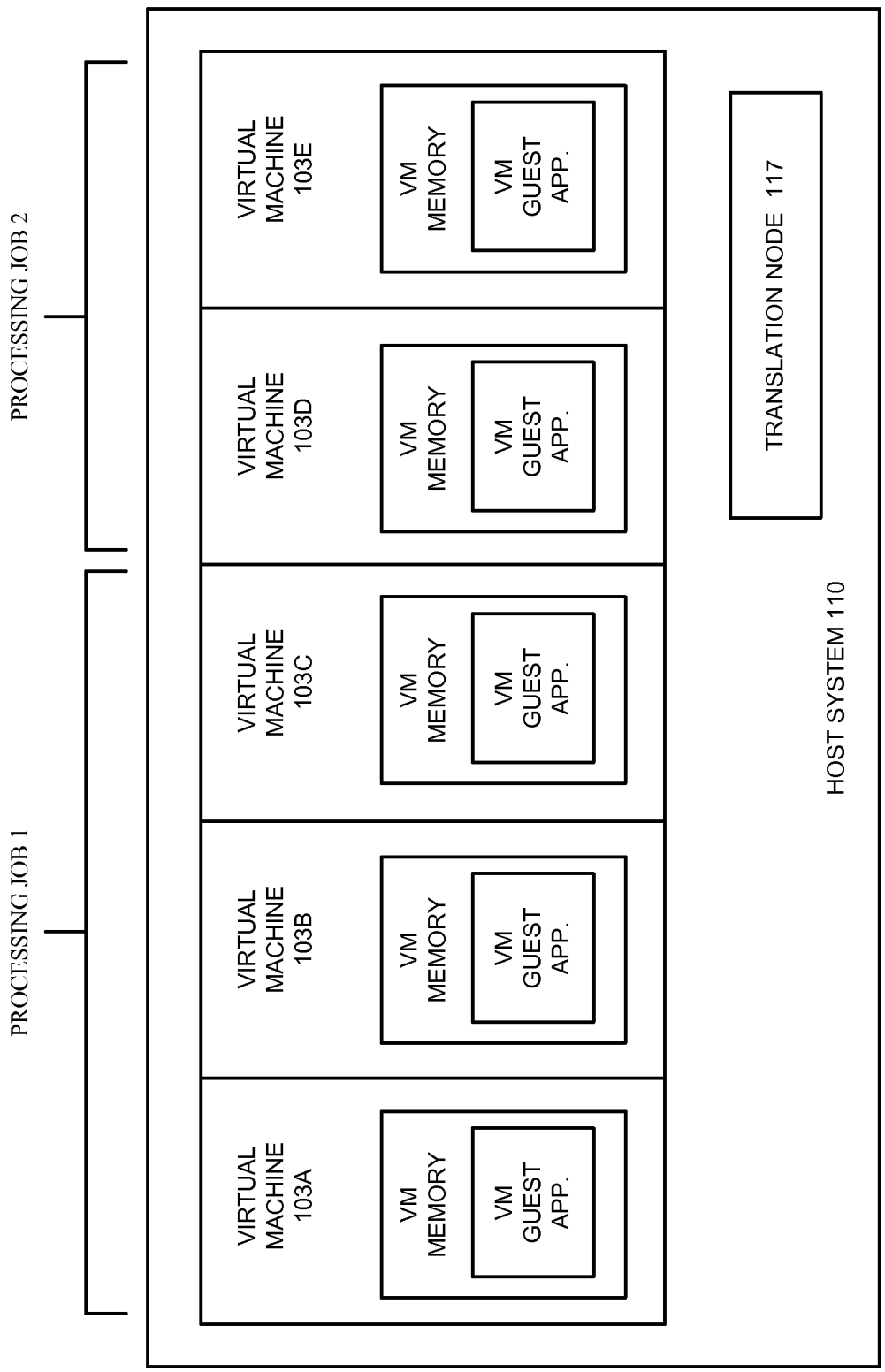
FIG. 8 shows an exemplary host system in one example.

FIG. 8 shows an exemplary host system 110 in one example. By host system 110, it is meant any suitable host processing system, host operating system, or host operational software. The host system 110 also includes a translation node 117 in some examples. Each host system 110 can host multiple virtual machines 103 operating on the host system 110 in a virtual data processing environment. In this example, the host system 110 includes a plurality of virtual machines 103A-103E resident on the host system 110. The virtual machines may execute processing jobs, such as big-data processing jobs, wherein immense volumes of data are processed by a particular processing job. As a result, more than one virtual machine may be used to process a particular processing job. It should be understood that other logical components or sub-units may be included in the host system 110 but are not shown for clarity.

Each virtual machine 103 of the plurality of virtual machines may be located in a separate and distinct region of host memory of the host system 110. Each virtual machine includes virtual memory. The virtual memory comprises memory of the host system 110 that is allocated to the particular virtual machine. The virtual memory of a virtual machine may store data to be used or processed by the virtual machine. The virtual memory may additionally store a guest application, wherein the guest application can be executed by the virtual machine. The guest application comprises a job processing application that performs at least part of a processing job. Each virtual machine of the plurality of virtual machines may execute a guest application or applications.

In the example shown, the host system 110 includes five virtual machines 103A-103E that are involved in a portion of at least two processing jobs. The virtual machines 103A-103C are employed in processing a processing job one while virtual machines 103D-103E are employed in processing a processing job two. It should be understood that more than the three virtual machines 103A-103C may be employed in processing job one and more than the two virtual machines 103D-103E may be involved in processing job two. These examples are given for illustration and are not intended to be limiting.

The configuration manager 130 (or 430, 630, or 730) may determine and set an initial resource allocation of a processing job. The configuration manager 130 may take into account the priority level of the particular processing job.

The configuration manager 130 or may take into account the priority levels of all processing jobs of the host system 110. The configuration manager 130 may take into account the priority levels of all processing jobs in the virtual data-processing environment 100 (i.e., the configuration manager 130 can allocate more virtual machines 103 to a high-priority processing job).

The resource allocation can comprise the host system resources that are allocated to a particular processing job. For example, the resource allocation can comprise the number of virtual machines 103 that are allocated to a particular processing job. The resource allocation can further comprise the host system resources that are allocated to a particular virtual machine 103. It should be understood that differing amounts of host system memory can be allocated to individual virtual machines, for example. A change in resource allocation can increase or decrease the virtual memory available to a particular virtual machine.

The translation node 117 monitors data read requests and participates in the read requests, as previously discussed. The translation node 117 may monitor a request queue of a virtual machine 103 and may handle read requests as they occur. Other mechanisms are possible, such as direct calls between a data interface of the virtual machine 103 and the translation node 117. In some implementations, a completion queue is maintained, wherein the translation node 117 records the completed read requests in the completion queue.

The translation node 117 translates the region in guest memory that is implicated by a read request. The read request is a request made by a guest application. The translation node 117 translates the guest memory region into the region in host memory where the requested data will be transferred.

In the host system 110, the virtual machine memory is mapped to a portion of the host memory. The translation node 117 determines the mapping and uses the determined memory mapping to provide the requested data to the virtual machine memory of the requesting virtual machine 103. As a result, the translation node 117 facilitates data retrieval in the virtual machine 103. Further, the translation node 117 can receive the configuration information 131 from the configuration manager 130. The translation node 117 can use the configuration information 131 to set up for a new processing job, as previously discussed.

The configuration may be achieved at a basic I/O level in the host system 110. A virtual machine 103 of a host system 110 is not aware of the source of the data as the data is received in the virtual machine 103. A virtual machine 103 of a host system 110 is not aware of the data access protocol of the data as the data is attempted to be accessed and retrieved.

The configuration manager and method configure a host system or host systems for processing jobs. The configuration manager and method configure some or all virtual machines of a host system. The configuration manager and method configure processing jobs across host systems. The configuration manager and method configure all processing jobs being processed on a host system.

The configuration manager and method determine the configuration information and settings needed for processing jobs in a distributed virtual data-processing environment. The configuration manager and method provide the configuration information and settings to appropriate host systems of the distributed virtual data-processing environment. The configuration manager and method provide the configuration information and settings to the translation nodes of appropriate host systems of the distributed virtual data-processing environment.

The configuration manager provides location data to translation nodes of all host systems that will be involved in an upcoming processing job. The configuration manager anonymizes the data that is provided to host systems. The configuration manager anonymizes the data provided to one or more virtual machines instantiated on a host system. The configuration manager anonymizes the data provided to one or more processing jobs running on a virtual machine or machines, and running across one or more host systems. As a result, a processing job does not need to be modified to include the actual location (or locations) of the job data. Likewise, the instantiated virtual machines and host machines do not need to be modified to include the location data.

The configuration manager includes location data that points each translation node to the storage systems to be used in a processing job. Consequently, the configuration manager can configure a processing application according to a current user, wherein the processing application is configured and used by more than one user. Alternatively, the processing application can be configured and used by different users at different times.

The virtual data-processing environment is designed to support multiple host systems running multiple processing jobs. The virtual data-processing environment is designed to support host systems running multiple instantiated virtual machines.

The virtual data-processing environment eliminates the need for co-location of application execution and application data. The virtual data-processing environment enables the management of multiple application instances in order to maximize the use of available hardware resources. The virtual data-processing environment provides a policy-based automation and provides user-friendly application management. The virtual data-processing environment provides an ability to automatically modify application scale during run-time in order to provide a desired QoS. The virtual data-processing environment enables sharing of resources between multiple processing jobs.

Various implementations described herein provide for accelerated data operations in which data is provided for consumption to applications executing within virtual environments in a manner that enables big data jobs and other resource intensive tasks to be virtualized. In particular, data that resides externally with respect to a virtual environment can be read by guest elements executing within the virtual environment at a pace sufficient to allow for very data intensive jobs. This is accomplished by enhancing the read process such that data read from a source is written in host memory that is associated with guest memory allocated to the guest elements.

In at least one implementation, a virtual machine is instantiated within a host environment. The virtual machine may be instantiated by a hypervisor running in the host environment. The hypervisor may run with or without an operating system beneath it. For example, in some implementations the hypervisor may executed at a layer above the host operating system, while in other implementations the hypervisor may be integrated with the operating system.

The virtual machine may include various guest elements, such as a guest operating system and its components, guest applications, and the like, that consume and execute data. The virtual machine may also include virtual representations of various computing components, such as guest memory, a guest storage system, and a guest processor.

In operation, a guest element running in the virtual machine is allocated a portion of the guest memory available in the virtual machine. In some scenarios, the guest memory may include guest virtual memory. In normal operation, a guest element would initiate a read process to read data from a guest storage system in the virtual machine. The data would be read from the guest storage system and written to the portion of the guest memory allocated to the guest element.

Figure 9:
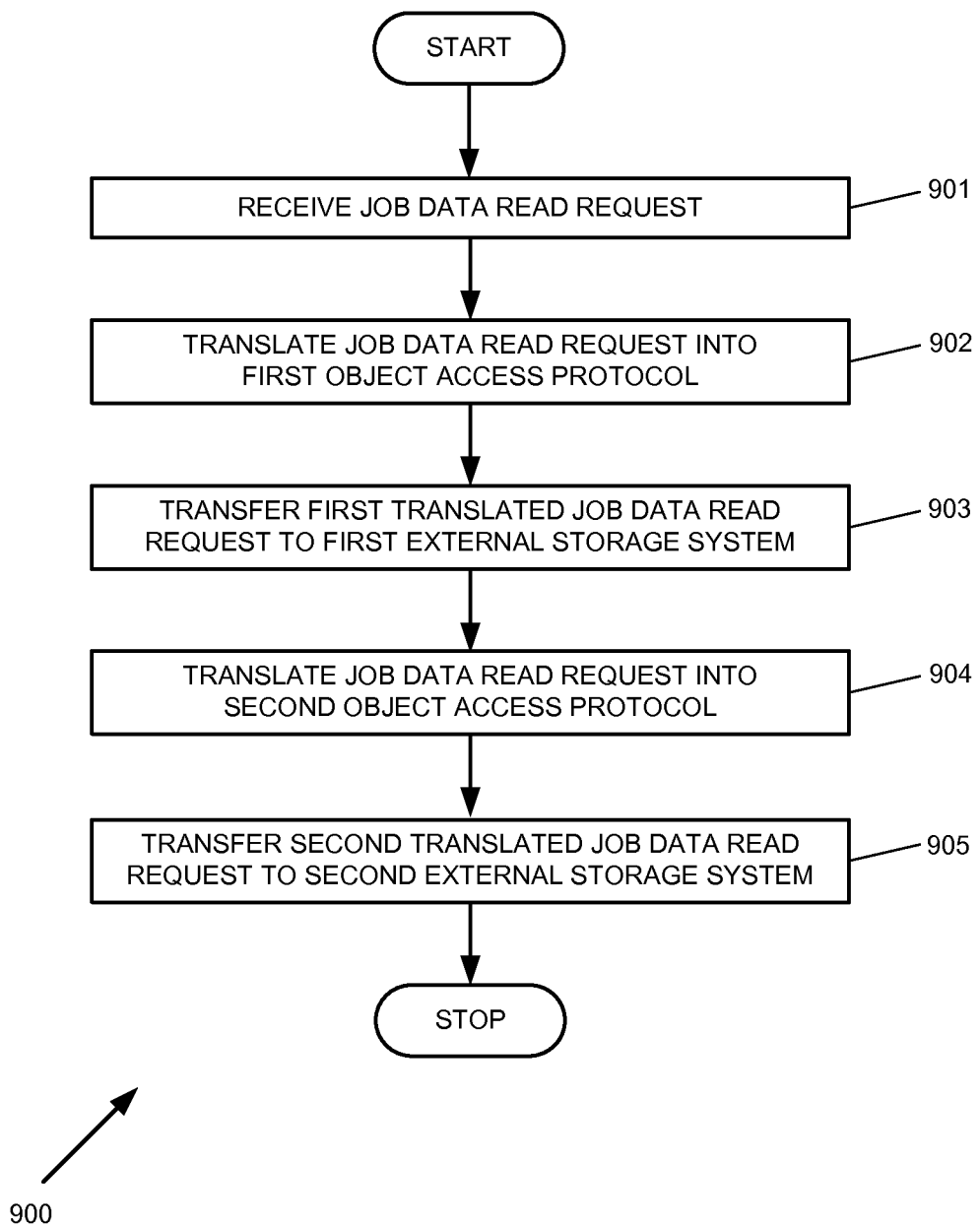
FIG. 9 is a flowchart showing a method for processing a processing job in a host system in a virtual data-processing environment.

FIG. 9 is a flowchart 900 showing a method for processing a processing job in a host system in a virtual data-processing environment. In step 901, as part of processing the processing job, a translation node of the host system receives a job data read request. The host system generates the job data read request requesting job data for the processing job. The job data read request is intercepted by the translation node.

In step 902, the translation node of the host system translates the job data read request into a first object access protocol, creating a first translated job data read request. The first object access protocol is a object access protocol used by a first external storage system.

In step 903, the first translated job data read request is transferred to the first external storage system. The first external storage system receives the first translated job data read request, wherein the first translated job data read request is in the first object access protocol. The first external storage system is therefore able to respond to the first translated job data read request and supply a requested job data portion to the host system.

In step 904, the translation node translates the job data read request into a second object access protocol, creating a second translated job data read request. The second object access protocol is a object access protocol used by a second external storage system. The second external storage system is different from the first external storage system and may use a different object access protocol.

In step 905, the second translated job data read request is transferred to the second external storage system. The second external storage system receives the second translated job data read request, wherein the second translated job data read request is in the second object access protocol. The second external storage system is therefore able to respond to the second translated job data read request and supply a requested job data portion to the host system.

It should be understood that in some cases, the object access protocol of an external storage system may already be the object access protocol in use by the host system, and therefore for such an external storage system, the job data read request will not require translation. It should be understood that the method might be iteratively repeated, depending on the number of external storage systems being accessed and on the number of different object access protocols being used by the external storage systems.

Figure 10:
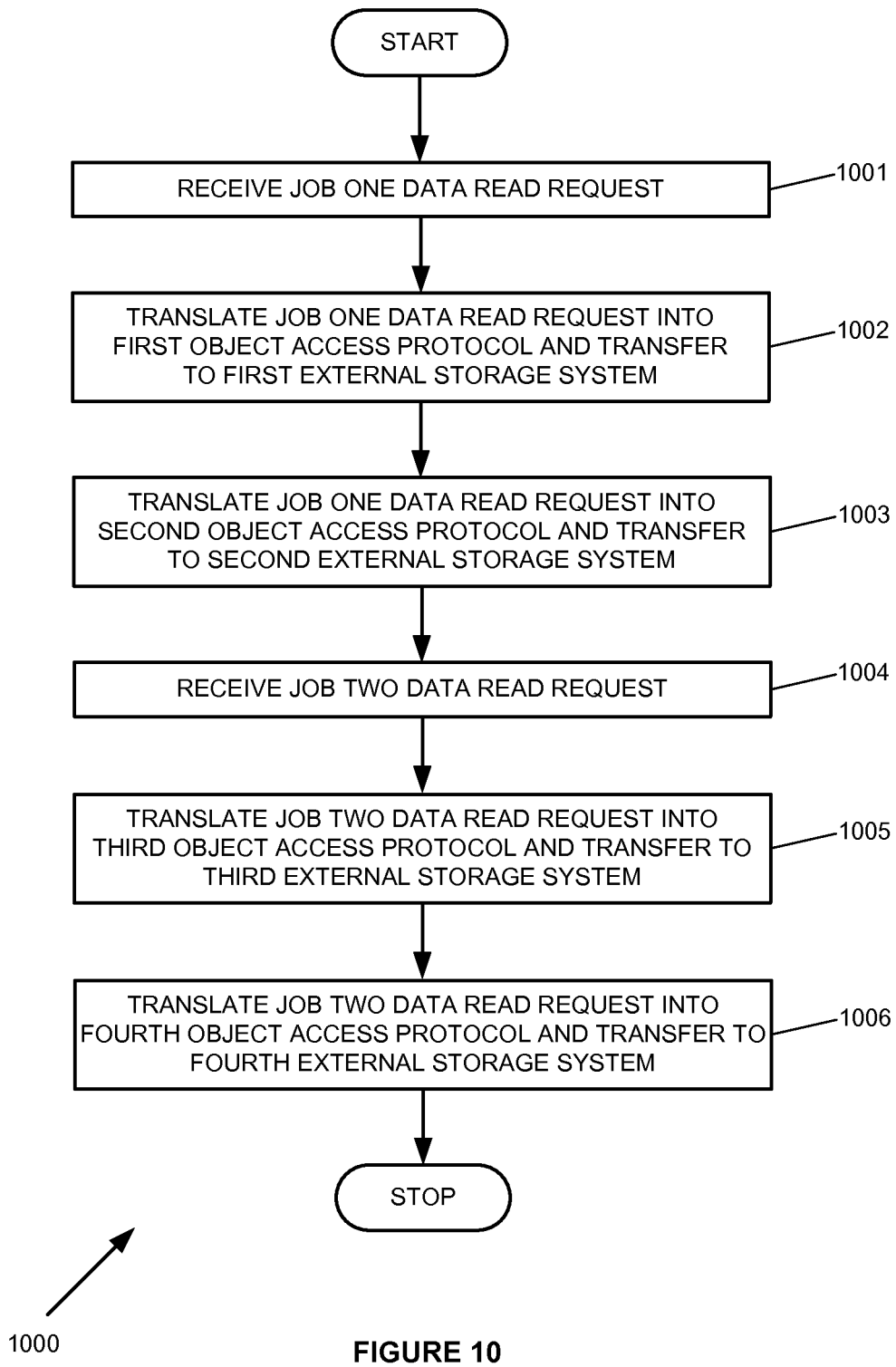
FIG. 10 is a flowchart showing a method for processing a processing job one and a processing job two in a host system in a virtual data-processing environment.

FIG. 10 is a flowchart 1000 showing a method for processing a processing job one and a processing job two in a host system in a virtual data-processing environment. In step 1001, a translation node of the host system receives a job one data read request corresponding to the processing job one. The host system generates the job one data read request and the job one data read request is intercepted by the translation node.

In step 1002, the translation node of the host system translates the job one data read request into a first object access protocol, creating a first translated job one data read request. The first object access protocol is a object access protocol used by a first external storage system. The first translated job one data read request is transferred to the first external storage system, wherein the first translated job one data read request is in the first object access protocol. The first external storage system is therefore able to respond to the first translated job one data read request and supply a requested job one data portion to the host system.

In step 1003, the translation node translates the job one data read request into a second object access protocol, creating a second translated job one data read request. The second object access protocol is a object access protocol used by a second external storage system. The second external storage system is different from the first external storage system and may use a different object access protocol. The second translated job one data read request is transferred to the second external storage system, wherein the second translated job one data read request is in the second object access protocol. The second external storage system is therefore able to respond to the second translated job one data read request and supply a requested job one data portion to the host system.

In step 1004, the translation node of the host system receives a job two data read request corresponding to the processing job two. The host system generates the job two data read request and the job two data read request is intercepted by the translation node.

In step 1005, the translation node of the host system translates the job two data read request into a third object access protocol, creating a third translated job two data read request. The third object access protocol is a object access protocol used by a third external storage system. The third translated job two data read request is transferred to the third external storage system, wherein the third translated job two data read request is in the third object access protocol. The third external storage system is therefore able to respond to the third translated job two data read request and supply a requested job two data portion to the host system.

In some examples, the third object access protocol may be the same as one of the first or second object access protocols. Alternatively, the third object access protocol may be different from both the first and second object access protocols.

In step 1006, the translation node translates the job two data read request into a fourth object access protocol, creating a fourth translated job two data read request. The fourth object access protocol is a object access protocol used by a fourth external storage system. The fourth external storage system is different from the third external storage system and may use a different object access protocol. The fourth translated job two data read request is transferred to the fourth external storage system, wherein the fourth translated job two data read request is in the fourth object access protocol. The fourth external storage system is therefore able to respond to the fourth translated job two data read request and supply a requested job two data portion to the host system.

In some examples, the fourth object access protocol may be the same as one of the first or second object access protocols. Alternatively, the fourth object access protocol may be different from both the first and second object access protocols. However, the fourth object access protocol is different from the third object access protocol.

Figure 11:
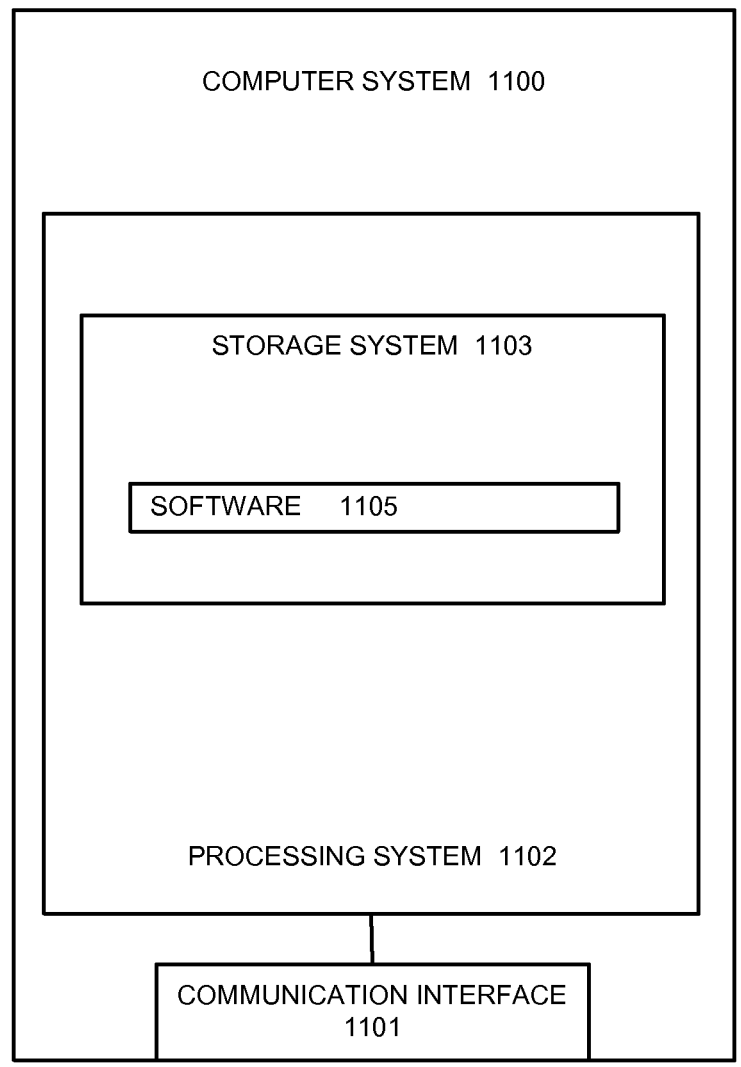
FIG. 11 shows detail of an exemplary host system in another example.

FIG. 11 shows detail of an exemplary computer system 1100. The computer system 1100 includes a communication interface 1101, a processing system 1102 coupled to the communication interface 1101, and a storage system 1103 coupled to the processing system 1102. The storage system 1103 can be separate from or included in the processing system 1102.

The storage system 1103 in the example shown includes software 1105. In some examples, the software 1105 comprises operating instructions that configure the processing system 1102, when executed by the computer system 1100 in general or the processing system 1102 in particular, to direct the processing system 1102 to perform configuration manager or host system operations. Other data, such as operational data, may also be stored in the storage system 1103. The software 1105 comprises the configuration manager routine 638 of FIG. 6 or the configuration manager routine 738 of FIG. 7 in some examples. Alternatively, the software 1105 comprises a host system routine that performs the functions of the host system 110 of FIG. 8 in some examples.

The processing system 1102 may comprise a microprocessor and other circuitry that retrieves and executes the software 1105 from the storage system 1103. The processing system 1102 may be implemented within a single processing device, but may also be distributed across multiple processing devices or sub-systems that cooperate in executing program instructions. Examples of the processing system 1102 include general purpose central processing units, application specific processors, and logic devices, as well as any other type of processing device, combinations, or variations.

The storage system 1103 may comprise any computer readable storage media readable by the processing system 1102 and capable of storing the software 1105. The storage system 1103 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal.

In addition to storage media, in some implementations the storage system 1103 may also include communication media over which the software 1105 may be communicated internally or externally. The storage system 1103 may be implemented as a single storage device but may also be implemented across multiple storage devices or sub-systems co-located or distributed relative to each other. The storage system 1103 may comprise additional elements, such as a controller, capable of communicating with the processing system 1102 or possibly other systems.

The software 1105 may be implemented in program instructions and among other functions and may, when executed by the processing system 1102, direct the processing system 52 to operate as described herein. In particular, the program instructions may include various components or modules that cooperate or otherwise interact to carry out configuration of one or more host systems. The various components or modules may be embodied in compiled or interpreted instructions or in some other variation or combination of instructions. The various components or modules may be executed in a synchronous or asynchronous manner, in a serial or in parallel, in a single threaded environment or multi-threaded, or in accordance with any other suitable execution paradigm, variation, or combination thereof. The software 1105 may include additional processes, programs, or components, such as operating system software, hypervisor software, or other application software. The software 1105 may also comprise firmware or some other form of machine-readable processing instructions executable by the processing system 1102.

In general, the software 1105, when loaded into the processing system 1102 and executed, may transform a suitable apparatus, system, or device from a general-purpose computing system into a special-purpose computing system customized to facilitate accelerated data input and output with respect to virtualized environments. Indeed, encoding the software 1105 on the storage system 1103 may transform the physical structure of the storage system 1103. The specific transformation of the physical structure may depend on various factors in different implementations of this description. Examples of such factors may include, but are not limited to the technology used to implement the storage media of the storage system 1103 and whether the computer-storage media are characterized as primary or secondary storage, as well as other factors.

The communication interface 1101 may include communication connections and devices that allow for communication with other computing systems (not shown) over a communication network or collection of networks (not shown). The communication interface 1101 may include user input and output devices for being controlled by a user. The communication interface 1101 may include associated user interface software executable by the processing system 1102 in support of various user input and output devices.

Although the examples provided in FIGS. 1-11 use read requests to illustrate the translation mechanism, it should be understood that the translation and cache services described herein might also be used to translate write requests. For instance, when a write request is received from a virtual cluster using a first object access format, the translation configuration may be used to translate the write request to a second object access format that is appropriate for the destination storage system. Thus, although the virtual cluster may use a single object access format, the translation or cache service may be used to translate requests into one or more other object access formats appropriate for the available storage systems.

The functional block diagrams, operational sequences, and flow diagrams provided in the figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a cache service to interface between a virtual machine cluster and job data associated with a job executed by the virtual machine cluster, the method comprising:
    in the cache service, identifying a request initiated by the job on a virtual machine of the virtual machine cluster to access at least a portion of the job data from a storage system, wherein the request is in accordance with a first distributed object access protocol and wherein the job data is stored on the storage system using a second distributed object access protocol;
    in the cache service, in response to the request, accessing at least the portion of the job data in accordance with the second distributed object access protocol;
    in the cache service, presenting at least the portion of the job data to the job on the virtual machine in accordance with the first distributed object access protocol;
    in the cache service, identifying a second request initiated by the job on the virtual machine of the virtual machine cluster to access at least a second portion of the job data from a second storage system, wherein the second request is in accordance with the first distributed object access protocol and wherein the job data is stored on the second storage system using a third distributed object access protocol;
    in the cache service, in response to the second request, accessing at least the second portion of the job data in accordance with the third distributed object access protocol; and
    in the cache service, presenting at least the second portion of the job data to the job on the virtual machine in accordance with the first distributed object access protocol.

2. The method of claim 1 wherein accessing at least the portion of the job data in accordance with the second distributed object access protocol comprises accessing at least the portion of the job data in accordance with at least one of Blob, Gluster, or S3 distributed object access protocols.

3. The method of claim 1 wherein the job comprises a big data processing job.

4. The method of claim 1 wherein the virtual machine cluster comprises a Hadoop virtual machine cluster, and wherein the first distributed object access protocol comprises Hadoop Distributed File System (HDFS) access protocol.

5. The method of claim 1 wherein the virtual machine cluster comprises one or more virtual machines executing on one or more host computing systems, and wherein the cache service executes on the one or more host computing systems.

6. The method of claim 5 wherein accessing at least the portion of the job data in accordance with the second distributed object access protocol comprises accessing at least the portion of the job data from a storage system external to the one or more host computing systems in accordance with the second distributed object access protocol.

7. The method of claim 5 wherein accessing at least the portion of the job data in accordance with the second distributed object access protocol comprises accessing at least the portion of the job data from a storage system located on the one or more host computing systems in accordance with the second distributed object access protocol.

8. A computer apparatus to interface between a virtual machine cluster and job data associated with a job executed by the virtual machine cluster, the computer apparatus comprising:
processing instructions that direct a computing system, when executed by the computing system, to:
identify a request initiated by the job on a virtual machine of the virtual machine cluster to access at least a portion of the job data from a storage system, wherein the request is in accordance with a first distributed object access protocol and wherein the job data is stored on the storage system using a second distributed object access protocol;
in response to the request, access at least the portion of the job data in accordance with the second distributed object access protocol;
present at lease the portion of the job data to the job on the virtual machine in accordance with the first distributed object access protocol;
identify a second request initiated by the job on the virtual machine of the virtual machine cluster to access at least a second portion of the job data from a second storage system, wherein the second request is in accordance with the first distributed object access protocol and wherein the job data is stored on the second storage system using a third distributed object access protocol;
in response to the second request, access at least the second portion of the job data in accordance with the third distributed object access protocol; and
present at least the second portion of the job data to the job on the virtual machine in accordance with the first distributed object access protocol; and
one or more non-transitory computer readable media that store the processing instructions.

9. The computer apparatus of claim 8 wherein the processing instructions to access at least the portion of the job data in accordance with the second distributed object access protocol direct the computing system to access at least the portion of the job data in accordance with at least one of Blob, Gluster, or S3 distributed object access protocols.

10. The computer apparatus of claim 8 wherein the job comprises a big data processing job.

11. The computer apparatus of claim 8 wherein the virtual machine cluster comprises a Hadoop virtual machine cluster, and wherein the first distributed object access protocol comprises Hadoop Distributed File System (HDFS) access protocol.

12. The computer apparatus of claim 8 wherein the virtual machine cluster comprises one or more virtual machines executing on one or more host computing systems, and wherein the cache service executes on the one or more host systems.

13. The computer apparatus of claim 12 wherein the processing instructions to access at least the portion of the job data in accordance with the second distributed object access protocol direct the computing system to access at least the portion of the job data from a storage system external to the one or more host computing systems in accordance with the second distributed object access protocol.

14. The computer apparatus of claim 12 wherein the processing instructions to access at least the portion of the job data in accordance with the second distributed object access protocol direct the computing system to access at least the portion of the job data from a storage system located on the one or more host computing systems in accordance with the second distributed object access protocol.

15. A computer apparatus to configure a cache service to interface between a virtual machine cluster and job data associated with a job executed by the virtual machine cluster, the computer apparatus comprising:
processing instructions that direct a configuration manager, when executed by the configuration manager, to:
identify two or more storage systems required by the virtual machine cluster for the job;
determine two or more distributed object access protocols corresponding to the two or more storage systems;
identify a translation configuration for the virtual machine cluster based on the required two or more storage systems, wherein the translation configuration configures the cache service to act as an intermediary between the virtual machine cluster using a first distributed object access protocol and the two or more storage systems using the two or more distributed object access protocols, and wherein the cache service identifies requests in accordance with the first distributed object access protocol from the virtual machine cluster, accesses job data for each of the requests in accordance with a distributed access protocol in the two or more distributed object access protocols, and presents the job data in accordance with the first distributed object access protocol to a requesting virtual machine in the virtual machine cluster; and
transfer the translation configuration to the cache service to configure the cache service, wherein the cache service executes on host systems with the virtual machine cluster; and
one or more non-transitory computer readable media that store the processing instructions.

16. The computer apparatus of claim 15 wherein the translation configuration comprises one or more file access translation modules.

17. The computer apparatus of claim 15 wherein the two or more storage systems comprise Blob, Gluster, or S3 storage systems.

18. The computer apparatus of claim 15 wherein the virtual machine cluster comprises one or more virtual machines executing on one or more host computing systems, and wherein the first distributed access protocol comprises Hadoop Distributed File System (HDFS) access protocol.

* * * * *